Oct. 4, 1932.  O. C. NATLIS  1,881,220
GLASS CUTTING MACHINE
Filed Sept. 9, 1930   2 Sheets-Sheet 1
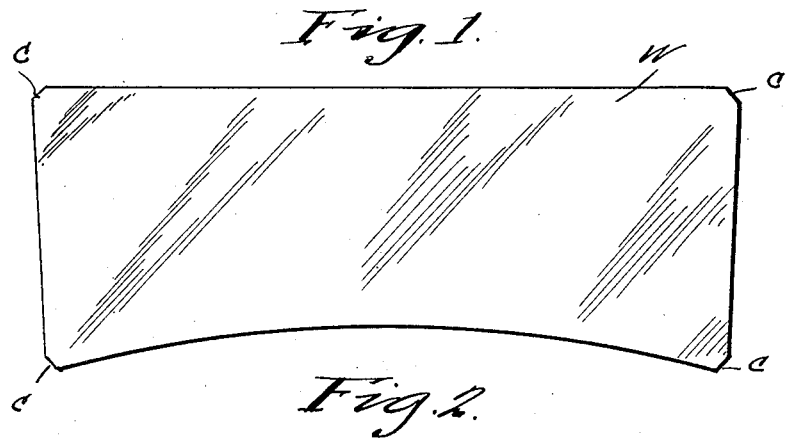
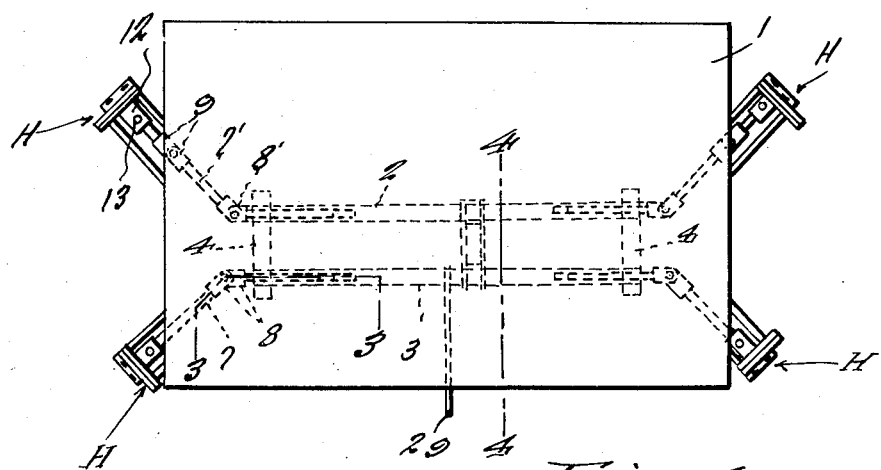
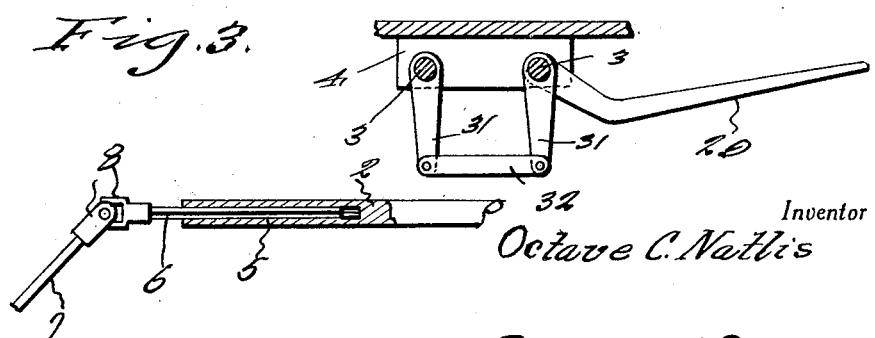
Inventor
Octave C. Natlis
By Clarence A. O'Brien
Attorney

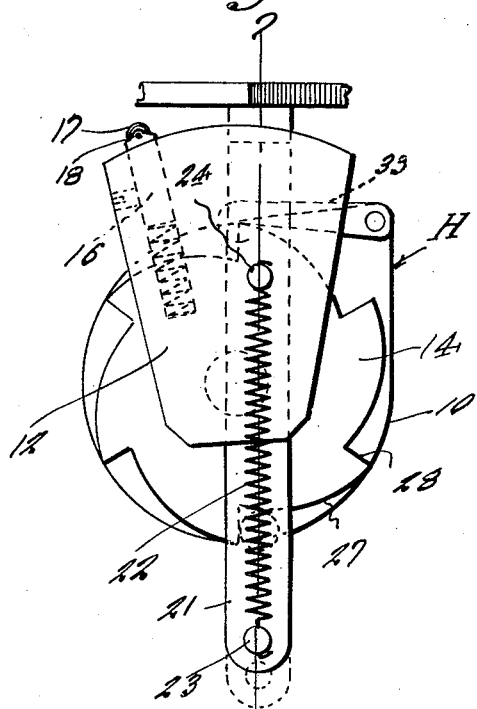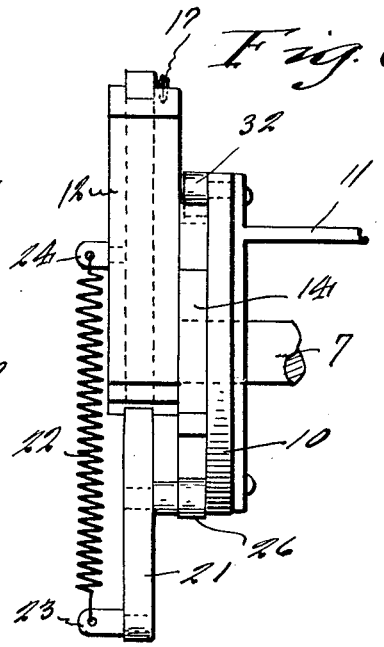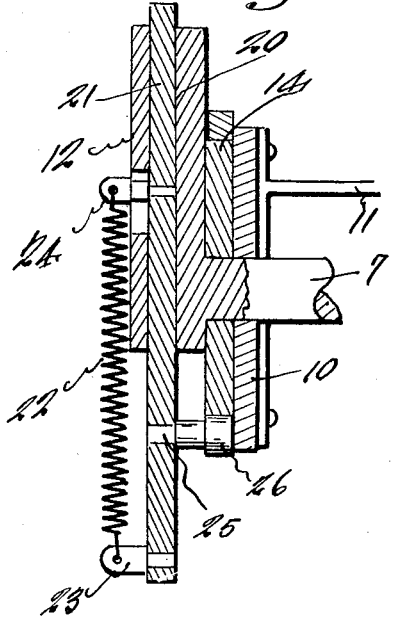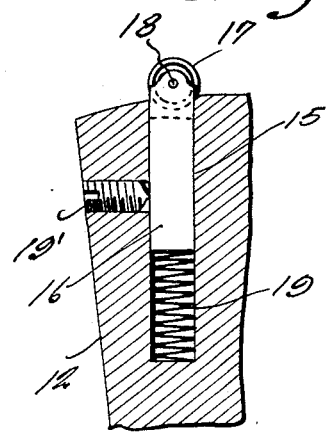

Patented Oct. 4, 1932

1,881,220

UNITED STATES PATENT OFFICE

OCTAVE C. NATLIS, OF CHARLESTON, WEST VIRGINIA, ASSIGNOR TO LIBBEY-OWENS-FORD GLASS COMPANY, OF TOLEDO, OHIO, A CORPORATION OF OHIO

GLASS CUTTING MACHINE

Application filed September 9, 1930. Serial No. 480,788.

This invention relates to certain new and useful improvements in glass cutting machines, and the primary object of this invention is to provide a glass cutting machine especially, but not necessarily, adapted for use in conjunction with that type of glass cutting machine forming the subject matter of a copending application Serial No. 294,022, July 19, 1928.

A primary object of this invention is to provide a glass cutter for scoring and subsequently breaking the corners of glass.

Other objects and advantages of the invention will become apparent during a study of the following description, taken in connection with the accompanying drawings wherein:

Figure 1 is a plan view of a windshield with the corners cut as comprehended by the present invention, Figure 2 is a top plan view of a table illustrating the application of present invention therewith, Figure 3 is a fragmentary sectional view taken substantially on line 3—3 of Figure 2, Figure 4 is a similar view taken substantially on line 4—4 of Figure 2, Figure 5 is an elevational view of one of the cutting units, Figure 6 is a side elevational view thereof, Figure 7 is a detail sectional view taken substantially on the line 7—7 of Figure 5, Figure 8 is a fragmentary detail section illustrating the mounting of the cutting elements.

Referring more in detail to the drawings, it will be seen that a table 1 is provided, and upon this table is flatly placed the glass from which the windshied W is to be cut. As suggested in Figure 2, the glass 1 in its original shape is substantially rectangular, and when cut and shaped, will, in its completed form have the appearance of the finished windshield W shown in Figure 1.

In cutting the windshield, by way of explanation, it may be stated that the glass is laid flat upon the table and a suitable cutting mechanism, preferably that type of cutting mechanism embodying the subject matter of the above identified pending application for patent is used for shaping the windshield after which the corner cutting elements forming part of the present invention may be brought into operation for cutting the corners of the windshield as at C.

According to the present invention, there is provided preferably a pair of shafts 2, 3, rockably supported beneath the table top by suitable brackets 4. Each shaft at each end thereof is provided with a bore 5 square in cross section, to receive square shaft sections 6, 6'.

To the outer end of each of the shafts 6 carried by shaft 3 there is connected one end of a shaft 7 through the medium of a universal joint 8.

To the outer end of each of the shafts 6' carried by shaft 2, there is coupled one end of a sectional shaft 7'. The sections of the respective sectional shaft 7' are coupled together through the medium of universal joints 9.

On the outer free end of each shaft 7, 7' is a cutter head structure designated generally by the reference character H. Each of said structures comprise a disk or plate 10 held rigid against movement in any direction, through the medium of suitable braces or braces 11 that brace and support plate 10 on the shaft in spaced relation to an adjacent edge of table 1. A substantially segmental-shaped carrier block or plate 12 adjacent the lower smallest end thereof is provided with a lateral sleeve keyed to the outer end of shaft 7, 7' as at 13. The plate 10 is provided with a suitable aperture to accommodate the sleeve of carrier block 12, as is also a ratchet wheel 14 interposed between plate 10 and carrier block 12, being loosely supported on the sleeve of said carrier block.

Carrier block 12, adjacent one edge thereof is provided with an elongated bore or socket 15, in which is slidably mounted the shank 16 of a suitable cutter element, which latter, also includes a cutting disk 17 rotatably supported in the bifurcated upper end of shank 16, as at 18.

Normally urging shank 16 outwardly of socket 15 is a suitably arranged coil spring 19 that impinges the inner end of the shank to yieldably retain cutter 17 in cutting contact with a portion of the windshield glass W. A set screw 19' threaded in block or carrier 12 has its inner end engaging shank 16 to prevent ejection of shank 16 under influence of spring 19. Set screw 19 engages shank 16 to such an extent as to offer only enough resistance to the spring as to prevent ejection of the shank as above set forth without positively locking the shank against sliding movement.

The block or carrier 12 is also provided with a bore 20 extending therethrough from the upper to the lower edge of the carrier block. Slidable in bore 20 is an elongated hammer element 21 that has its upper end normally urged outwardly of the upper end of bore 20, through the medium of coil spring 22 that at its lower end is anchored to hammer 21 adjacent the lower end thereof as at 23. The upper end of coil spring 22 is anchored as at 24 to an intermediate portion of block 12.

Each hammer 21 at the lower end thereof is provided with a roller 26 mounted on a lateral pin 25, and engageable with the teeth of ratchet wheel 14. Thus, as is apparent, when the roller 26 rides over a cam face 27 of the ratchet wheel from one tooth to the next adjacent tooth thereof, the hammer is reciprocated within the bore 20 for movement into and out of forcible engagement with the glass for breaking the scored corner portion thereof.

For simultaneously actuating the cutting and breaking units H, there is provided a suitably mounted actuating lever 29 that is suitably engaged with shaft 3. Each of shafts 2 and 3 is provided with a crank arm 31, and these crank arms 31 are operatively connected together through the medium of links 32 so that obviously upon rocking of lever 29, the shafts 2 and 3 will be simultaneously rocked thereby imparting rocking movement to the cutters operatively associated therewith in the manner above described.

In arranging the present invention on the table, the cutters H will be so arranged as to have a cutter H adjacent each corner of the table. Obviously then, by rocking lever 29, the carrier blocks 12 will be simultaneously rocked in a suitable direction. During this rocking movement of the carrier blocks 12, the cutters 17 engage the glass inwardly from the corners thereof to move obliquely with respect to the longitudinal axes of the glass thus scoring the glass adjacent said corners. When each carrier block 12 has so moved in this direction, roller 26 contacting one tooth of ratchet wheel 14 will cause the latter to rotate in a clockwise direction, reference being had to Figure 5.

As is thought apparent, the rocking of shafts 2 and 3 back and forth, will result in a step by step rotation of the ratchet wheels 14, the ratchet wheels 14 being held against retrograde movement, through the medium of dogs 33 pivoted to the upper corners of the plate 10 and engageable with the teeth 28 of the ratchet wheel. This step by step movement of the ratchet wheels will cause intermittent movement of the hammers 21 into and out of forcible engagement with the scored corners of the glass for breaking the corners subsequent to the scoring thereof. When the operation is completed, the corners of the glass will be such as clearly shown in Figure 1 and designated by the reference character C.

From the foregoing then it will be apparent that I have devised a thoroughly practical, efficient and comparatively simple device for scoring, and subsequently breaking the scored corners of a windshield glass subsequent to the cutting of the glass for preventing a windshield of the desired edge configuration.

Even though I have herein shown and described the preferred embodiment of my invention, it is to be understood that the same is susceptible to changes fully comprehended by the spirit of the invention as herein described, and the scope of the appended claims.

Having thus described my invention, what I claim as new is:

1. In a glass cutting apparatus, a glass supporting table, a member rockably supported thereon adjacent a corner of the table, a cutter element carried by said member and movable therewith for scoring an adjacent corner portion of said glass, and a hammer member carried by said first mentioned member and movable relative thereto for subsequently breaking the scored corner portion of the glass.

2. A windshield glass cutting machine comprising in combination a glass supporting table, a plurality of cutter heads carried on said table and rotatable relative thereto on horizontal axes, each of said cutter heads including a cutter for scoring an adjacent corner portion of the glass, and a hammer having a sliding fit with said head for subsequently breaking the scored corner portion of the glass upon completion of the scoring operation, and means for simultaneously actuating said heads.

3. A windshield glass cutting apparatus comprising in combination a rockably mounted shaft, a carrier block carried by said shaft and movable therewith, a cutting element carried by said block for scoring an adjacent portion of the glass to be cut, a hammer member having a sliding fit with said carrier block, and means for reciprocating said hammer during oscillation of said carrier block.

4. A windshield glass cutting apparatus comprising in combination a rockably mounted shaft, a carrier block carried by said shaft and movable therewith, a cutter carried by said carrier block, a hammer member movable relative to said carrier block, means for supporting said hammer member on said carrier block, a fixed member, a ratchet wheel loosely mounted on said shaft between said carrier block and said fixed member, a pivotally mounted dog carried by said fixed member adapted to successively engage the teeth of said ratchet wheel, a roller carried by said hammer member and ridable over the periphery of said ratchet wheel, and spring means normally urging said roller in engagement with the periphery of said ratchet wheel.

5. A windshield glass cutting apparatus comprising a glass supporting table, a plurality of cutter heads rockably mounted on said table, one adjacent each corner of the glass to be cut, means for simultaneously rocking said cutter heads, a cutter carried by each of said cutter heads for scoring an adjacent corner portion of the glass, and adapted to operatively contact said glass upon rocking movement of said cutter head in one direction, a hammer member carried by each of said cutter heads, and means for moving said hammers relative to the respective cutter heads away from the glass during cutting movement of the latter and then suddenly releasing said hammer whereby said hammer will be brought into forcible engagement with the adjacent scored portions of the glass for breaking the same.

6. An apparatus for scoring and breaking a relatively stationary sheet of glass, comprising a cutter carrier rockable on an axis parallel to the plane of the sheet, and a hammer member having a slidable fit on said carrier for movement into contact with said sheet.

7. An apparatus for scoring and breaking a fixed sheet of glass comprising a rockably mounted carrier block, a cutter mounted thereon, a hammer or breaking element slidably mounted on the block, and cam means for shifting the breaking element relative to the block during rocking movement of the latter.

8. An apparatus for scoring and breaking a sheet of glass, comprising a rockably mounted carrier block, a cutter mounted thereon, a breaking element slidably mounted on the block, elastic means normally urging the breaking element toward the glass and means acting oppositely to said elastic means during rocking movement of the block for moving said breaking element away from the sheet and then suddenly releasing it.

9. An apparatus for obliquely scoring a relatively fixed sheet of glass, comprising a rockably mounted carrier block, a cutter mounted thereon, a breaking element slidably mounted on the carrier block, spring means normally urging the cutting element toward the glass, a circular member rotatable about an axis common to the axis of said block, and provided with a circular series of cam faces, and a member on the breaking element engaging said cam faces.

10. An apparatus for obliquely scoring the corners of a relatively stationary sheet of glass, comprising a plurality of cutting devices arranged substantially in the form of a rectangle and respectively including a member rockable about a diagonally disposed axis, a cutter carried by the member, a breaking element shiftably mounted on the member, and means for simultaneously operating all of said cutting devices.

11. An apparatus for obliquely scoring the corners of a relatively stationary sheet of glass, and comprising a plurality of devices arranged in rectangular formation and respectively including a rockably mounted carrier block, a cutter element carried by said block, a hammer having a slidable fit with the carrier block, means for moving the hammer relative to the carrier block during rocking movement of the latter into and out of breaking engagement with the glass sheet, and means for simultaneously operating all of said devices.

12. A device for scoring and breaking a sheet of glass comprising a rockably mounted carrier block, a cutter carried thereby, a hammer element having a sliding fit with the carrier block, elastic means normally urging the hammer member in one direction, a rotatably mounted ratchet wheel having cam faces in alternate relation to the teeth thereof, a roller carried by the hammer slidable over said cam faces and engageable with the teeth, whereby to rotate the ratchet wheel step by step during rocking movement of the carrier block and to shift the hammer relative to the block against the action of said elastic means and then suddenly releasing it, and means for retaining the ratchet wheel against retrograde movement.

13. An apparatus for scoring a relatively staionary sheet of glass comprising a substantially rectangular table for supporting the sheet, a plurality of cutter carriers, each positioned adjacent one side of the table and rockable about an axis disposed at an angle to the said side of said table, a cutter carried by each carrier, and means for simultaneously rocking said carriers and cutters and causing the cutters during such rocking movement to effect scoring of the glass sheet.

14. An apparatus for scoring a relatively stationary sheet of glass comprising a table for supporting the sheet, a plurality of cutting devices arranged substantially at the corners of a rectangle and respectively including a member rockable about an axis disposed at an angle to the adjacent sides of said rectangle, a cutter carried by each member, and means for simultaneously rocking said members to operate all of said cutting devices.

15. An apparatus for scoring a relatively stationary sheet of glass comprising a substantially rectangular table for supporting the sheet, a plurality of substantially horizontal rockable shafts extending adjacent to and at an angle to the sides of said table, a cutter carried by each shaft, and means for simultaneously rocking said shafts to swing the cutters carried thereby through an arc and cause the said cutters during such swinging movement to effect scoring of the glass sheet.

16. An appartus for scoring a relatively stationary sheet of glass comprising a table for supporting the sheet, a plurality of cutting devices arranged substantially at the corners of a rectangle and respectively including a cutter holder, a substantially horizontal rockable shaft provided for and carrying each cutter holder, said shafts extending at an angle to the adjacent sides of said rectangle, a cutter carried by each cutter holder, and means for simultaneously rocking said shafts to operate all of said cutting devices.

17. An apparatus for scoring a relatively stationary sheet of glass comprising a table for supporting the sheet, a pair of horizontal substantially parallel rockable shafts, an auxiliary shaft carried at each end of each of said parallel shafts and arranged at an angle relative thereto and extending diagonally of the table, a cutter carried by each auxiliary shaft, and means for rocking the parallel shafts to effect simultaneous rocking of all of said auxiliary shafts to swing the cutters carried thereby through an arc and to cause the said cutter during such swinging movement to effect the scoring of the glass sheet.

18. An apparatus for scoring a relatively stationary sheet of glass comprising a substantially rectangular table for supporting the sheet, a pair of horizontal substantially parallel rockable shafts arranged beneath the table and extending longitudinally thereof, an auxiliary shaft carried at each end of each of said parallel shafts and arranged at an angle relative thereto and extending diagonally of the table, universal connections between said parallel shafts and auxiliary shafts, a cutter carried by each auxiliary shaft, said cutters being positioned outwardly of but adjacent the respective side edges of the table, and means for rocking the parallel shafts to effect simultaneous rocking of all of said auxiliary shafts to swing the cutters carried thereby through an arc and to cause the said cutters during such swinging movement to effect the scoring of the glass sheet.

In testimony whereof I affix my signature.

OCTAVE C. NATLIS.